US 6,709,032 B2
Mar. 23, 2004

(12) United States Patent
Huang

(10) Patent No.: US 6,709,032 B2
(45) Date of Patent: Mar. 23, 2004

(54) COVER-LOCKING DEVICE FOR OPTICAL DISK DRIVE

(75) Inventor: Hui-Chu Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 10/308,710

(22) Filed: Dec. 3, 2002

(65) Prior Publication Data
US 2003/0102678 A1 Jun. 5, 2003

(30) Foreign Application Priority Data
Dec. 4, 2001 (TW) ....................... 90221078 U

(51) Int. Cl.⁷ ................................ E05C 3/06
(52) U.S. Cl. ............. 292/201; 312/223.1; 292/DIG. 11; 369/96.5
(58) Field of Search ................ 292/201, 144, 292/DIG. 11, 341.16; 312/223.1, 223.2, 327, 328; 369/96.5; 360/133; 361/685

(56) References Cited

U.S. PATENT DOCUMENTS

| | | | | |
|---|---|---|---|---|
| 3,848,907 A | * | 11/1974 | Shiurila | 292/81 |
| 3,953,094 A | * | 4/1976 | Brown, Jr. | 312/303 |
| 4,155,610 A | * | 5/1979 | Englund | 312/222 |
| 4,763,212 A | * | 8/1988 | Kanno et al. | 360/99.06 |
| 4,979,384 A | * | 12/1990 | Malesko et al. | 70/241 |
| 5,379,184 A | * | 1/1995 | Barraza et al. | 361/685 |
| 6,091,571 A | * | 7/2000 | Hanson | 360/98.04 |
| 6,426,873 B1 | * | 7/2002 | Minase et al. | 361/686 |
| 6,501,646 B2 | * | 12/2002 | Suzuki | 361/686 |

* cited by examiner

Primary Examiner—Gary Estremsky
(74) Attorney, Agent, or Firm—Thomas, Kayden, Horstemeyer & Risley

(57) ABSTRACT

A cover-locking device for an optical disk drive. The cover-locking device includes a locking protrusion and a locking mechanism. The locking protrusion is formed on the cover and is provided with a locking hole. The locking mechanism is mounted on the main body, comprising an electromagnetic switch, a hook base, a hook, a pushing part and a link. The electromagnetic switch includes an extensible magnet adapted to move between a first position and a second position. The hook is pivotally connected to the hook base to lock the locking protrusion at the locking hole, and is further pivotally connected to the extensible magnet. The pushing part is pivotally connected to the hook base, comprising a pushing end adapted to open the cover. The link is pivotally connected to the pushing part with one end and pivotally connected to the extensible magnet with another end.

4 Claims, 6 Drawing Sheets

COVER-LOCKING DEVICE FOR OPTICAL DISK DRIVE

BACKGROUND OF THE INVENTION

1. Field of the Invention

The present invention relates to a cover-locking device, and particularly to a cover-locking device for use in an optical disk drive that can lock and release a cover of a lid-type optical disk drive.

2. Description of the Prior Art

External optical disk drives are classified into two types: tray type and lid type. Referring to FIG. 1, a tray-type optical disk drive 1 has a tray for carrying optical disks. However, objects may be inadvertently jammed between the slit 11 and the tray when the disk drive load or unload the disk. In practical, it is unavoidable. Lid-type optical disk drives are commonly used for CD, VCD, and DVD, and the lid of the disk drive can be opened and closed for loading/unloading the optical disk. The advantage of this design is that jamming problems mentioned above can be prevented. Currently, locking mechanisms for covers of this type are generally mechanical; that is, a cover is simply locked by a mechanical structure (e.g. a switch) and unlocked manually. A disadvantage is that malfunction may result from an inadvertently actuation of the cover switch.

Accordingly, a cover-locking device that can lock and release for the cover of the optical disk drives is required.

SUMMARY OF THE INVENTION

The present invention provides a cover-locking device for use in a lid-type optical disk drive that is adapted to open electronically, such that malfunctions resulting from inadvertently actuation are prevented.

The cover-locking device of the present invention includes a locking protrusion and a locking mechanism. The locking protrusion is formed on the cover and provided with a locking hole. The locking mechanism is mounted on the main body and comprises an electromagnetic switch, a hook base, a hook, a pushing part and a link. The electromagnetic switch includes an extensible magnet adapted to move between a first position and a second position. The hook is pivotally connected to the hook base to lock the locking hole of the locking protrusion, and is further pivotally connected to the extensible magnet. The pushing part is pivotally connected to the hook base, comprising a pushing end adapted to open the cover. The link is pivotally connected to the pushing part with one end and pivotally connected to the extensible magnet with the other end.

BRIEF DESCRIPTION OF THE DRAWINGS

The present invention can be fully understood from the following detailed description and preferred embodiment with reference to the accompanying drawings in which.

DETAILED DESCRIPTION OF THE EMBODIMENTS

The following detailed description of the best contemplated modes of carrying out the invention. This description is not to be taken in a limiting sense, but is made merely for the purpose of illustrating general principles of embodiments of the invention. The scope of the invention is best defined be the appended claims.

Figure 1:
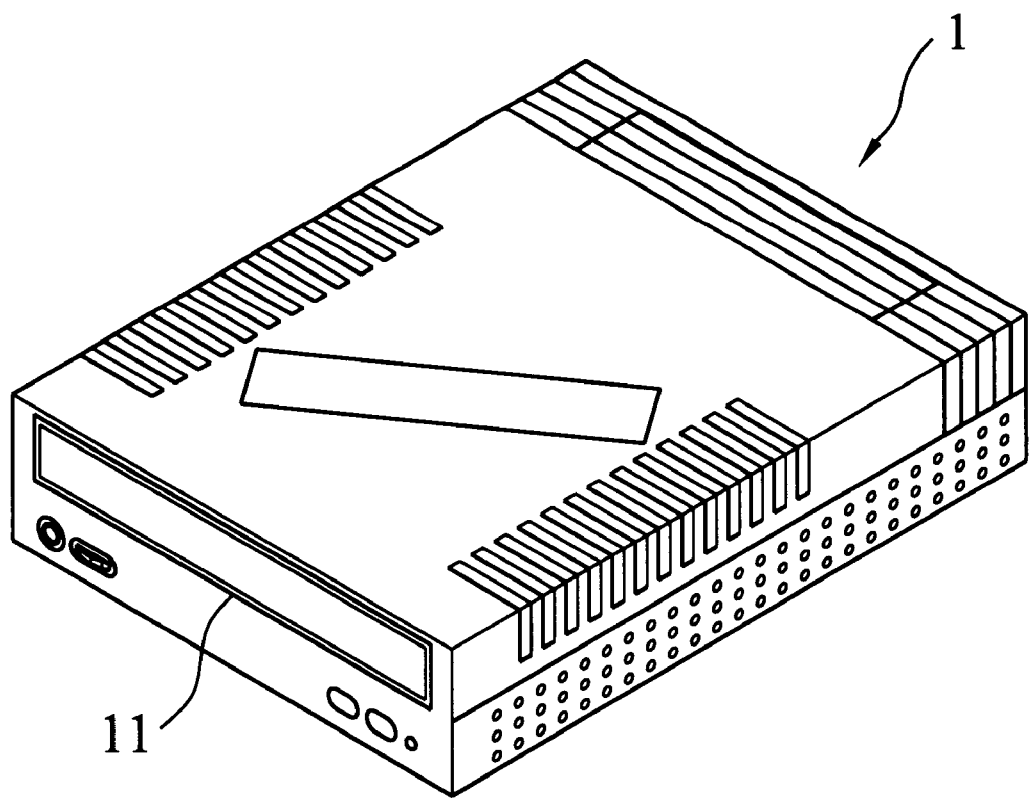
FIG. 1 shows a perspective view of an optical disk drive of the prior art.
Figure 2A:
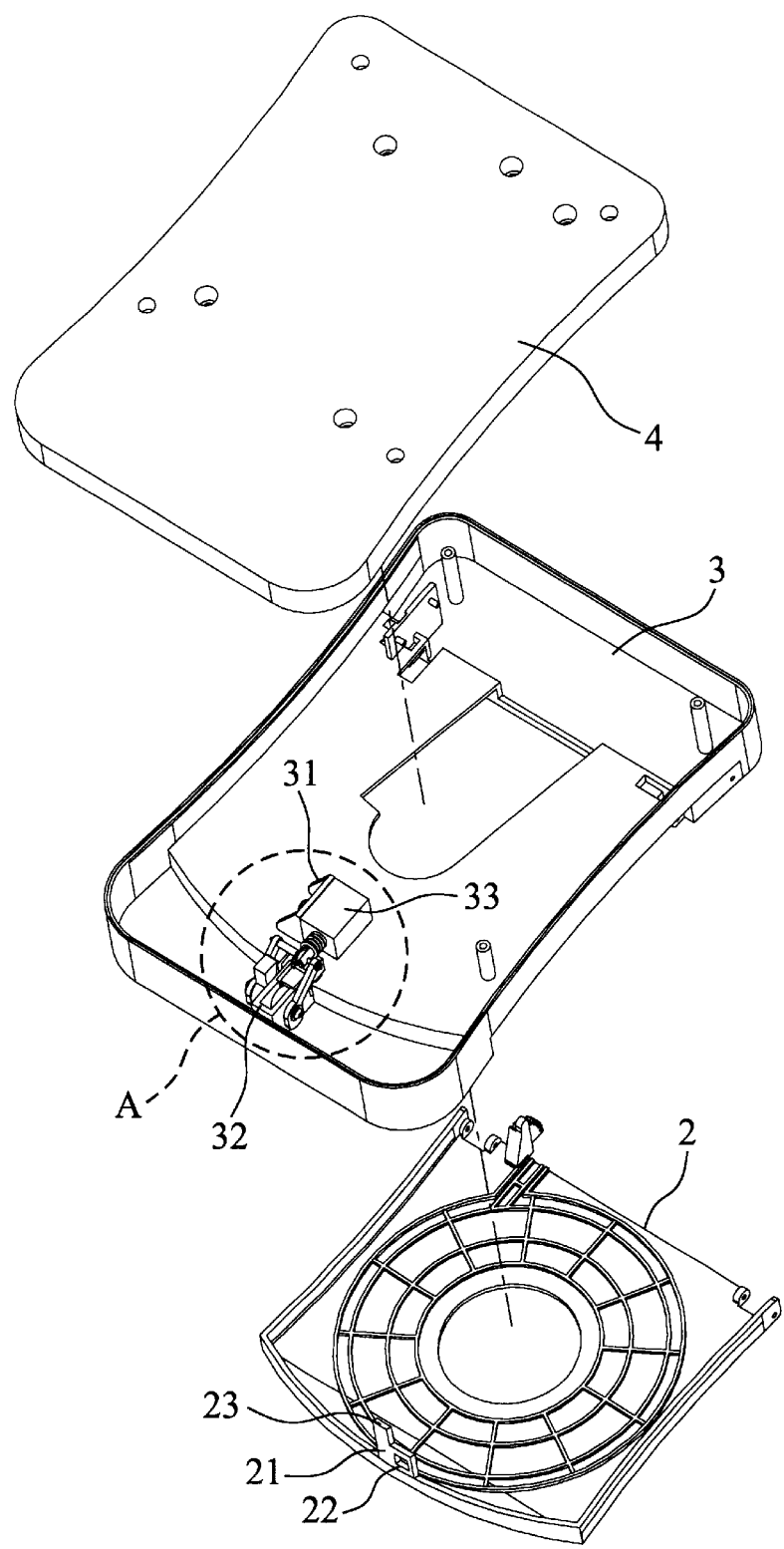
FIG. 2a is an exploded perspective view of the optical disk drive of the present invention, viewed from the bottom.
Figure 2B:
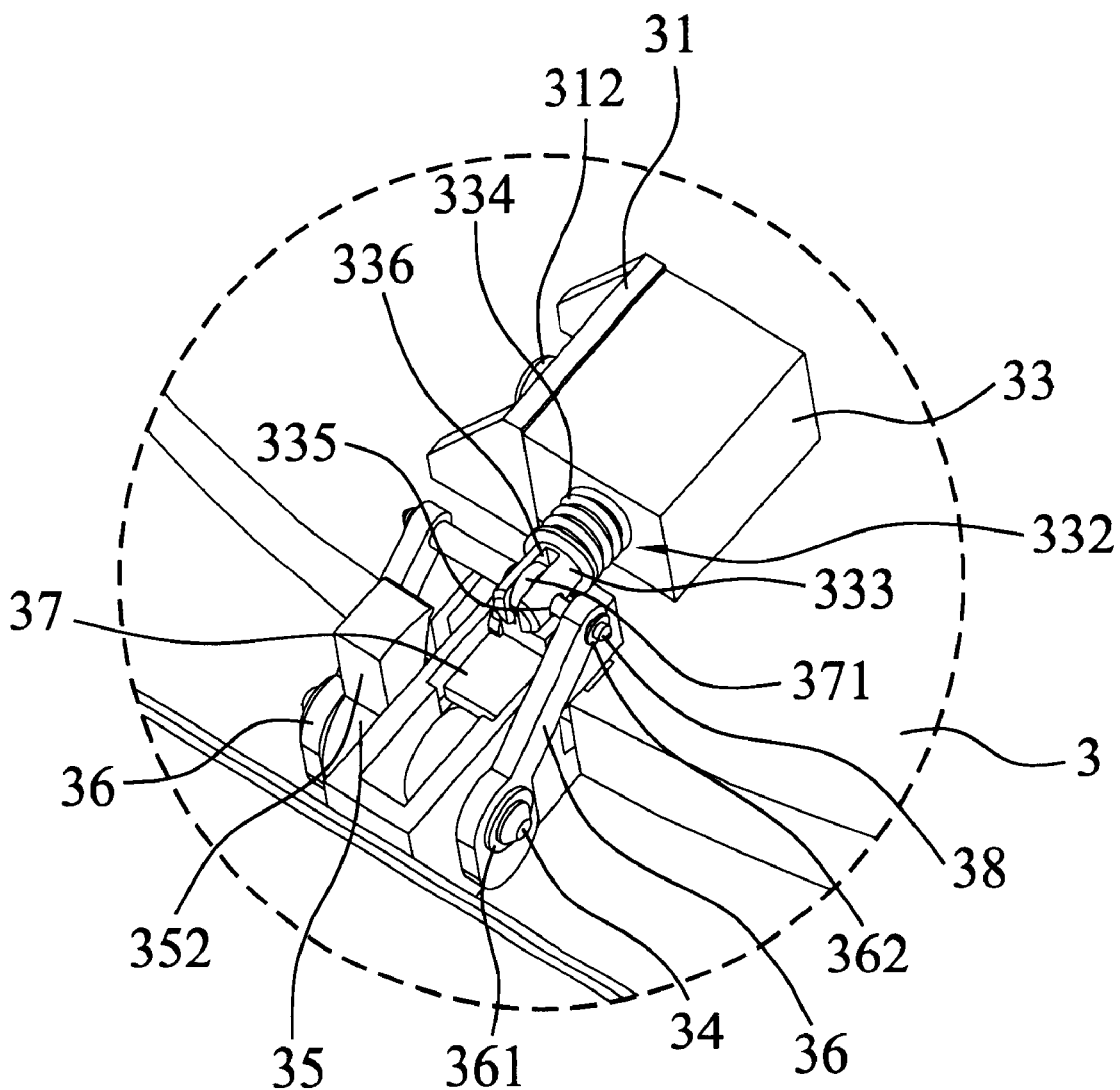
FIG. 2b shows an expended perspective view of area A in FIG. 2.

Referring to FIGS. 2a and 2b, the cover-locking device of present invention is installed in a lift-type optical disk drive that comprises a main body 3, a cover 2, and a base 4. The base 4 is mostly used for protection and is not related to the structure of the embodiment of the present invention, thus its further description is omitted.

In the embodiment, the cover 2 of the lift-type optical disk drive is to be closed manually.

The cover 2 is pivotally connected to the main body 3. A locking protrusion 21 is formed on the bottom surface 20 of the cover 2, and comprises a locking hole 22. The locking protrusion 21 further comprises a holding end 23 adapted to contact a pushing end 35, mentioned below.

Figure 3:
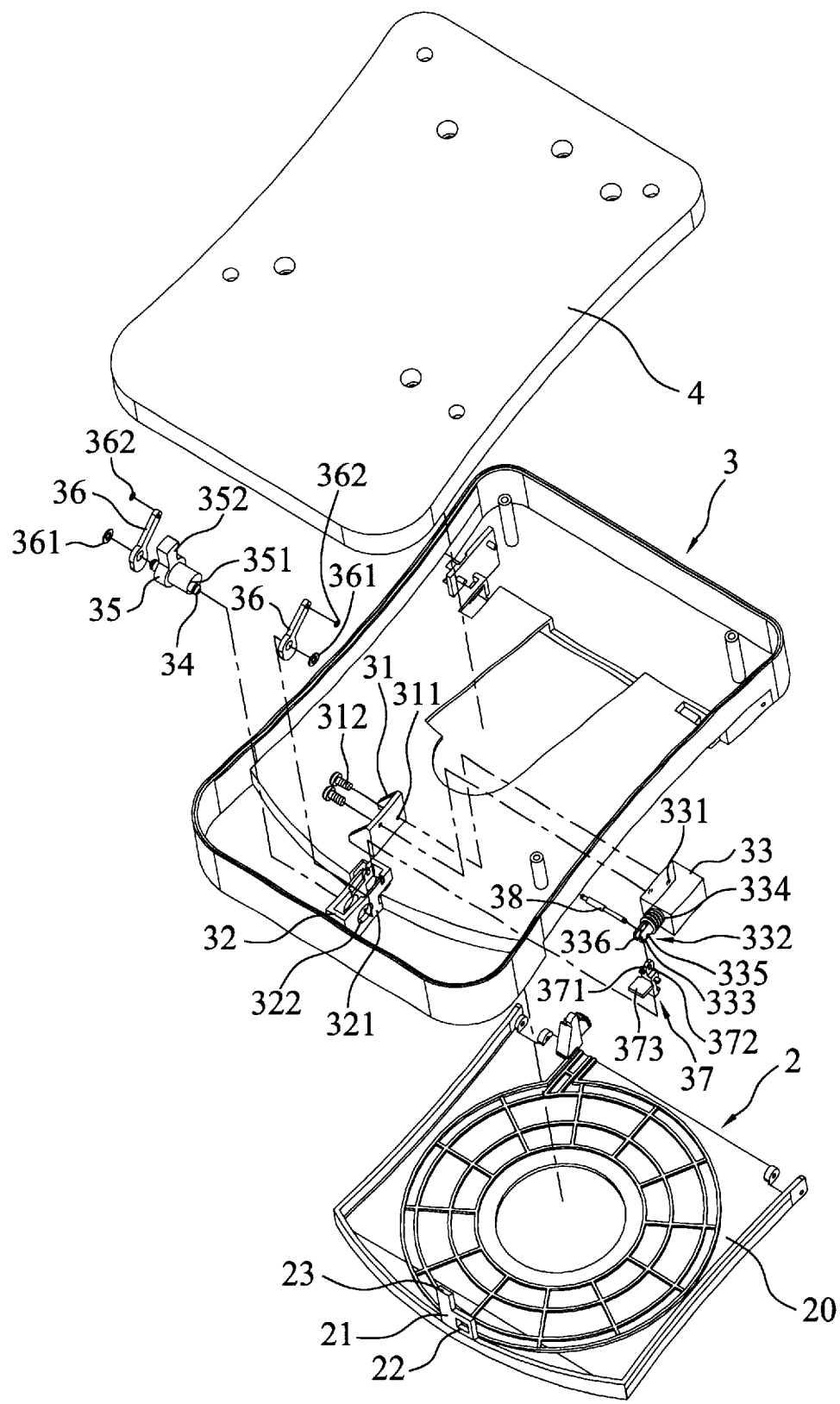
FIG. 3 shows another exploded view of the present invention.

Referring to FIGS. 2a, 2b and 3, the main body 3 has a locking mechanism (not numbered) mounted on the main body 3. The locking mechanism comprises a switch base 31 and a hook base 32. An electromagnetic switch 33 is fixed to the switch base 31 by a pair of screws 312 through holes 311 that is defined on the switch base 31. The electromagnetic switch 33 comprises an extensible magnet 332, a magnetic core 333 and a resilient member 334. In the embodiment, the extensible magnet 332 will move between a first position (backward) and a second position (forward). The magnetic core 333 defines a switch through hole 335 and notch 336 in its end.

The hook base 32 has a hook 37 pivotally connected thereto. The hook 37 comprises a hooking head 373, an insertion element 371, and a hook through hole 372. The hooking head 373 is fitted to the locking hole 22 and is adapted to lock the locking protrusion 21. The insertion element 371 is fitted to the notch 336 of the magnetic core 333, and is pivoted with a switch shaft 38 through both the switch through hole 335 and the hook through hole 372. That is, the hook 37 is pivotally connected to the extensible magnet 332 by the switch through hole 335. By means of the hook 37 and the extensible magnet 332, the hooking head 373 will release the locking protrusion 21 when the extensible magnet 332 moves toward the first position; that is, the extensible magnet 332 moves backward.

When the cover 2 is closed manually, the hooking head 373 is pushed by the locking protrusion 21 until the manual close is complete. The pushing force transfers pressure to the extensible magnet 332 and the resilient member 334. After the hooking head is engaged by the locking hole 22, the resilient member 334 push the hooking head 373 to prevent the cover from being opened inadvertently.

The hook base 32 further comprises a pushing part 35, and the pushing part 35 has a pushing end 352 adapted to push the holding end 23 of the cover 2 upwardly when the cover 2 is opened. A first shaft 351 is formed on the pushing part 35 with a second through hole 34. In the embodiment, the hook base 32 comprises first through holes 322 on its two sidewalls 321, and the pushing part 35 is pivotally coupled to the hook base 32 with the first shaft 351 passing through the first through holes 322.

Figure 4:
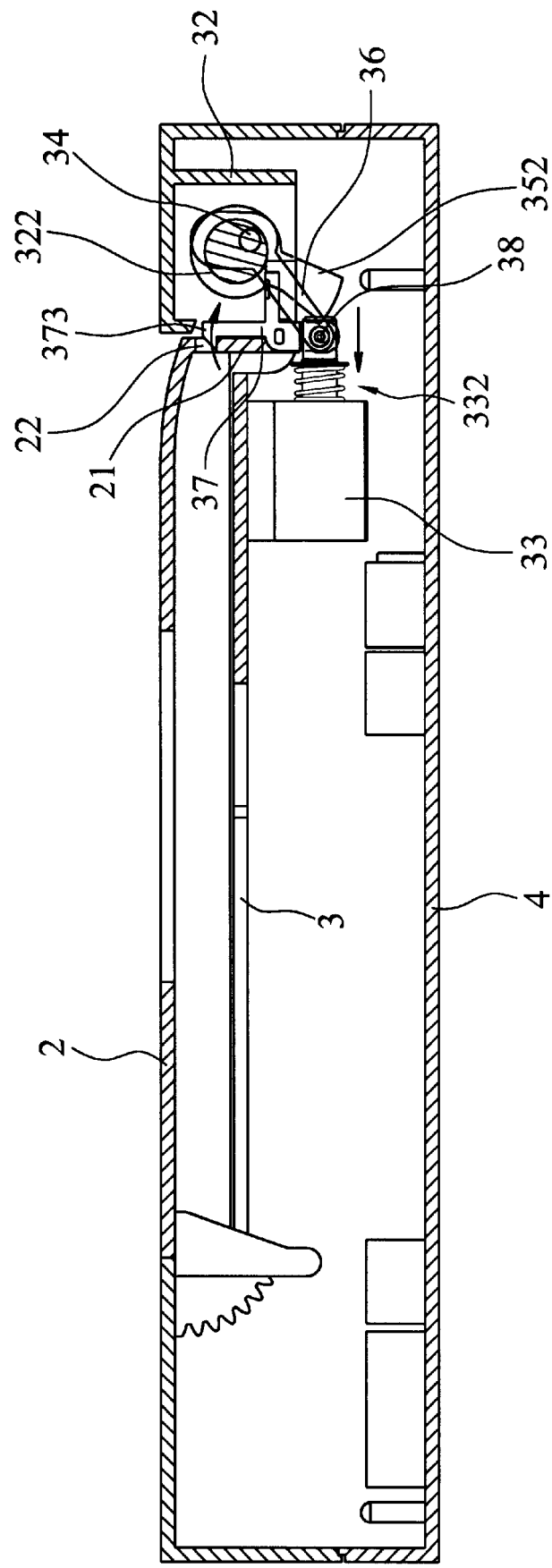
FIG. 4 shows a cross-section of the present invention with the cover closed.
Figure 5:
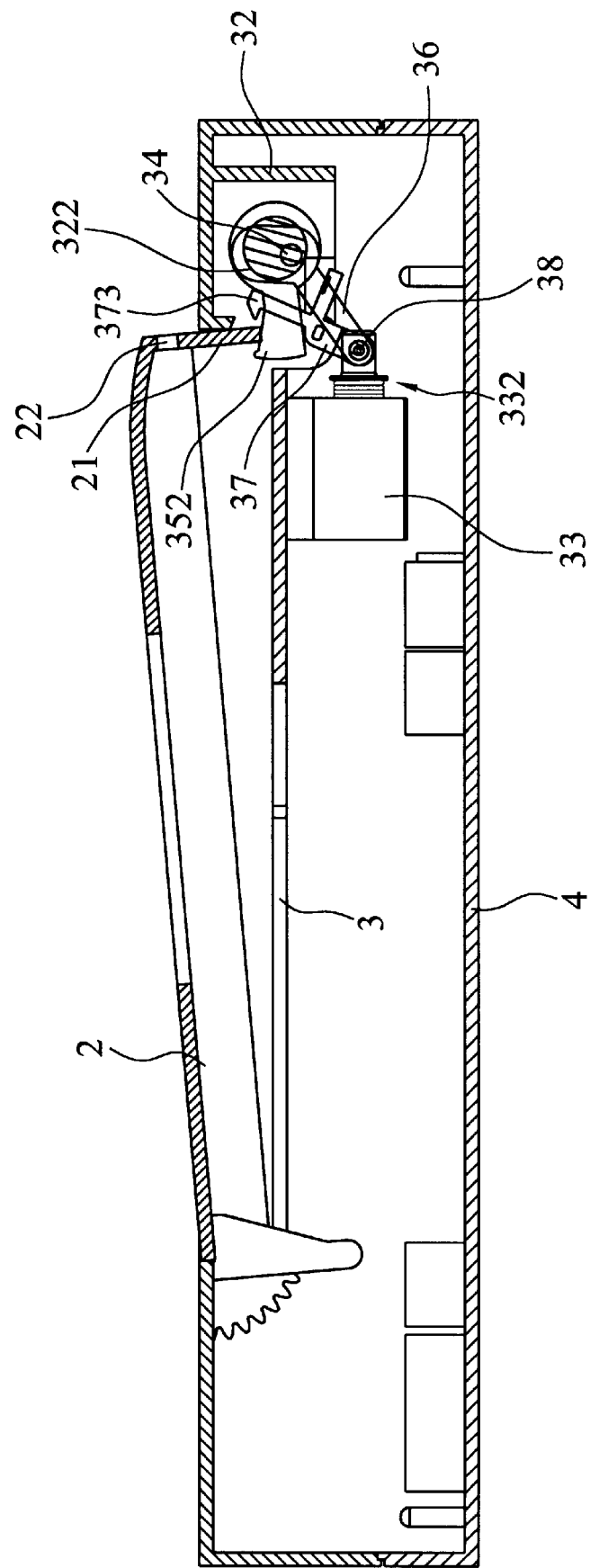
FIG. 5 shows a cross-section of the present invention with the cover open.

The second through hole forms a cylindrical space essentially parallel to the first shaft 351. A second shaft 34 passes through the second through hole. As well, two links 36, comprising hole-and-locking-ring pairs 361, 362 at each ends, are pivotally connected to the pushing part 35 by locking the hole-and-locking-ring pair 361 at both ends of the second shaft 34. The links 36 are further pivotally connected to the extensible magnet 332 by locking the hole-and-locking-ring pair 362 at both ends of the switch shaft 38. Referring to FIGS. 4 and 5, by means of the structure formed with the pushing part 35, the links 36, the extensible magnet 332 and the holding end 23, the pushing part 35 opens the cover 2 when the extensible magnet 332 moves backward and the hooking head 373 releases the locking protrusion 21.

The motion of the extensible magnet 332 may be realized by coupling the switch 33 to a device, such as an electrical controller, a signal generator, or a CPU.

The present invention provides opening of the cover of the optical disk drive by electronic means such that malfunctions from accidental deployment are prevented.

While the invention has been described with reference to preferred embodiments, the description is not intended to be construed in a limiting sense. It is thus contemplated that the appended claims will cover any such modifications or embodiments as may fall within the scope of the invention defined by the following claims and their equivalents.

What is claimed is:

1. A cover-locking device for an optical disk drive having a main body and a hinged cover thereon, the cover-locking device comprising:
    a locking protrusion formed on the cover and provided with a locking hole;
    a locking mechanism mounted on the main body, comprising:
        an electromagnetic switch comprising an extensible magnet to move between a first position and a second position, wherein a first axis is defined at the extensible magnet;
        a hook base;
        a hook pivotally connected to the hook base, comprising a hooking head adapted to lock the locking protrusion at the locking hole, and further pivotally connected to the extensible magnet at the first axis, such that the hooking head is adapted to release the locking protrusion as the extensible magnet moves toward the first position;
        a pushing part pivotally connected to the hook base, comprising a pushing end adapted to open the cover, and
        a link pivotally connected to the pushing part with one end and pivotally connected to the extensible magnet at the first axis with another end, such that the pushing part opens the cover as the extensible magnet moves toward the first position.

2. The cover-locking device as claimed in claim 1, wherein the extensible magnet comprises a magnetic core and a surrounding spring.

3. The cover-locking device as claimed in claim 1, further comprising:
    a first shaft formed on the pushing part, defining a second through hole forming a cylindrical space essentially parallel to the first shaft;
    a second shaft passing through the second through hole, wherein the link is pivotally connected to the pushing part by connection to an end of the second shaft; and
    the hook base further comprises a first through hole, wherein the pushing part is pivotally connected to the hook base with the first shaft passing through the first through hole.

4. The cover-locking device as claimed in claim 1, wherein the locking protrusion comprises a holding end adapted to contact the pushing end.

* * * * *